UNITED STATES PATENT OFFICE.

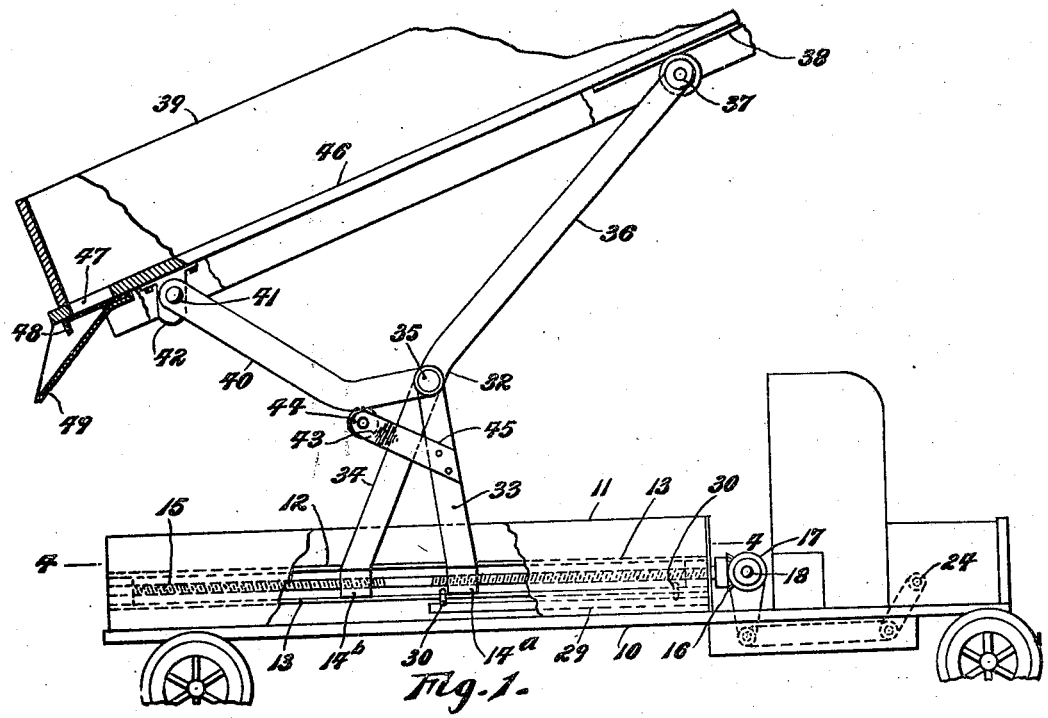

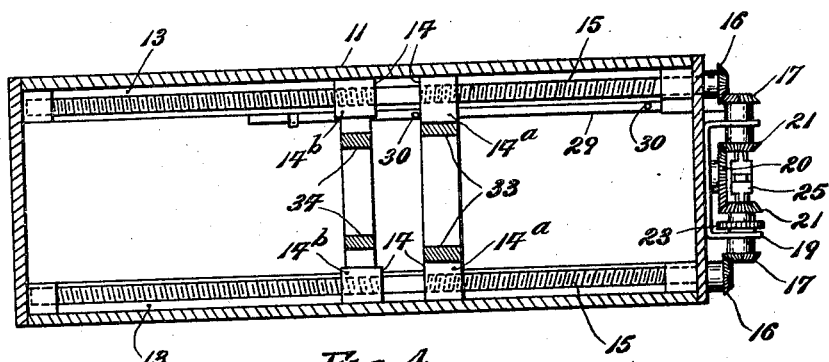
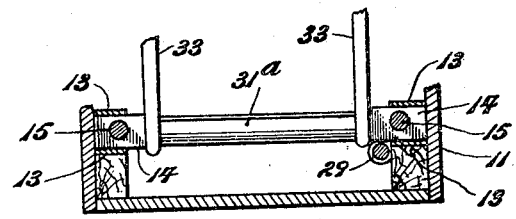

JOSEPH GASSER AND ALFRED H. BARBER, OF TRENTON, NEW JERSEY.

RAISING AND LOWERING DEVICE.

1,353,737.	Specification of Letters Patent.	Patented Sept. 21, 1920.

Application filed February 21, 1920. Serial No. 360,530.

*To all whom it may concern:*

Be it known that we, JOSEPH GASSER and ALFRED H. BARBER, citizens of the United States, residing at Trenton, in the county of Mercer and State of New Jersey, have invented new and useful Improvements in Raising and Lowering Devices, of which the following is a specification.

The invention relates to devices for raising and lowering objects or bodies and has for an object to provide a device for readily raising or lowering heavy bodies and the like to or from a horizontal position to an inclined position, the device being particularly adapted for use in connection with dump wagons for the raising or lowering of the dump boxes.

The invention is further particularly adapted for use in connection with the usual automobile trucks so that the raising and lowering mechanism can be operated by the motor of the truck to raise the dump box from its normal position on the body of the vehicle to an inclined or tilting position so that the contents of the dump box can gravitate therefrom or be readily removed from the dump car, the mechanism of course also providing for the return of the dump box to its normal position on the vehicle body.

It will of course be apparent that any form of motive power, manual or otherwise can be employed for the raising and lowering mechanism and that our invention is adapted particularly to the latter construction.

In the further disclosure of the invention, reference is to be had to the accompanying drawings, constituting a part of this specification, in which similar characters of reference denote corresponding parts in all the views, and in which,—

Figure 1— is a fragmentary side elevation showing the device applied to a dump wagon, the dump box being shown in tilting position with portions of the side of the frame broken away.

Fig. 2— is a front elevation of the operating and clutch mechanism.

Fig. 3— is a vertical longitudinal sectional view taken through the structure, the dump body being shown in its normal position.

Fig. 4— is a horizontal sectional view taken substantially on the line 4—4 in Fig. 1, showing the tripping mechanism for the clutch, the superposed parts being dotted, and Fig. 5— is a vertical sectional view taken through the frame and blocks.

Referring more particularly to the views, the numeral 10 indicates a vehicle chassis on which is mounted a frame 11, the latter if desirable, forming a complete part of the vehicle body or chassis. The frame 11 is of a substantially rectangular construction and on its inner face is provided with longitudinal side guides 12 which are formed by upper and lower spaced plates or strips 13, these guides being provided for the guiding of suitable blocks 14. Journaled in the ends of the frame 11 and extending longitudinally through the side guides 12, are screw rods 15, the said screw rods being threaded through the blocks 14 with each screw rod having right and left hand threads, one of the sets of blocks being in threaded engagement with the right hand threads of the screw rods and the other set of blocks with the left hand threads of the screw rods. The forward extremities of the screw rods carry suitable spur gears 16 which mesh with gears 17 on a cross shaft 18 carried on a suitable channel mounting 19 secured to the frame and it will of course be apparent that rotation of the shaft and the gears 17 will actuate the gears 16 to rotate the screw rods so as to move the two sets of blocks toward or away from each other. A differential 20 is provided comprehending opposed spur gears 21 and a central gear 20 in mesh with the spur gears 21, a suitable driven toothed wheel 23 being carried by one of the gears 21 and adapted by suitable chain or other connection to be driven by a driving wheel or gear 24. A sliding clutch element 25 is arranged upon the cross shaft 18 between the gears 21, to be engaged with one or the other of the gears to be held in a neutral position, it being clearly apparent that the idea is to govern the rotation of the toothed wheel 23. A stirrup 26 projects upwardly from the rod 27 to engage loosely with the clutch element 25, the rod being mounted to slide on the frame 11 and connected by a link 28 with an operating rod 29 mounted on the frame 11 and having pins 30 projecting therefrom at right angles thereto at certain distances on the rod 29. These pins act as trip pins to be engaged by the blocks on the same side of the frame so as to operate the clutch element 25 to automatically throw it into neutral position when the dump box to be hereinafter described, reaches the limit of its raised position or its normal position on the body of the vehicle.

For the purpose of clearer description I will term the front blocks 14$^a$ and the rear blocks 14$^b$. The front blocks 14$^a$ are connected by a cross shaft 31$^a$ and the rear blocks 14$^b$ by a cross shaft 31$^b$ and mounted on the cross shafts and in fact constituting a part of the construction, is a frame-work 32, consisting of a pair of parallel front arms 33 for the cross shaft 31$^a$ and which passes through the lower ends of the front arms and a pair of rear arms 34 for the cross shaft 31$^b$, which latter passes through the lower ends of the rear arms. A bearing shaft 35 is carried on the upper ends of the front arms 33 and passes through the front arms and also through the rear arms at the points at which they meet the front arms, said front and rear arms being relatively inclined toward each other. The rear arms 34 however extend forwardly and upwardly a considerable distance beyond the front arms in the nature of extensions 36 and the extremities of these extensions carry a cross shaft 37 which is in fact a roller to bear against a longitudinal flat plate 38 on the under-side of a dump box or other body 39. Mounted to swing on the extremities of the bearing shaft 35 are a plurality of rearwardly extending curved arms 30 which at their extremities have the ends of a cross bar or shaft 41 passing therethrough, the latter being mounted on a suitable channel mounting 42 secured to the underside of the dump box at the rear and these arms 40 at their points of curvature are adapted to roll over suitable rollers 43 mounted on bifurcated portions 44 of horizontally disposed extension bars 45, rigidly secured to the front arms 33.

Now by reference to the views it will be apparent that when the dump box is resting in a horizontal position upon the frame 11 and it is desired to raise and tilt the dump box to remove the contents thereof, power transmitted to the driven wheel 23 will result in rotation of the shaft 18 and one of the gears 21 being in mesh with the differential gear 21, rotation of the shaft in a certain direction will necessarily follow and thus the screw rods 15 will be rotated and the front and rear sets of blocks 14$^a$, 14$^b$ caused to move toward each other. This action brings about a raising of the arms 33, 34, causing the roller shaft 37 on the end of the extension 36 to ride upon the underside of the plate 38, thus raising the forward end of the dump box so as to bring about the tilting action and as the blocks continue to move toward each other the movement of the front arms will bring the extension bars 45 toward the curved arms 40 for the rollers 43 to engage with the curved portions of the curved arms thus causing the rear part of the dump box to be raised. In this manner after the front part of the dump box has been raised to a tilting position, the rear part will commence to move upwardly simultaneously with the upward movement of the front part of the dump box so as to bring about the desired elevation of the dump box, maintaining the same however in its tilting position so that the dump box can be brought to the desired elevation and its contents permitted to gravitate therefrom. The rear extremity of the floor 46 of the dump box has a cut out portion 47 into which the contents of the dump box will gravitate and the underside of the floor has a closure 48 for the cut out portion or opening provided with a suitable chute 49 provided at the rear beneath the cut out portion or opening 47 and which chute may be arranged in any desired position, the opening of the closure 48, which normally forms the bottom of the cut out portion, permitting the contents of the dump box to gravitate and pass into and through the chute.

It will now be seen that when the dump box is raised to its tilting and dumping position, one of the blocks will engage one of the pins 30 on the operating rod 29, actuating the latter and in turn through the medium of the link 28, rod 27 and stirrup 26, actuating the clutch element 25 to move the same into neutral position, thus bringing about a discontinuance of the upward movement of the dump box at the moment that the dump box has reached dumping position. Simultaneously when the clutch element is later on engaged with the other gear of the differential mechanism, the rotation of the screw rods will be reversed, causing the dump box to be lowered and when the dump box reaches its normal horizontal position, one of the blocks will engage the other trip pin 30 and again throw the clutch element into neutral position.

While we have described our device as applied to a dump vehicle, it will be understood that the invention is primarily a raising and lowering device or mechanism which may be adapted to various other purposes for the raising and lowering of heavy objects and the inclination or tilting thereof, although as mentioned heretofore, we particularly aim to adapt the device to vehicles such as one usually finds devoted to the carrying of material which is subsequently to be unloaded or dumped, and with this in mind our device takes up very little room on the vehicle, has no cumbersome projections extending beyond the front and rear of the vehicle body and provides for the ready moving of the dump box into and out of dumping positions.

Having described our invention, we claim—

1. In a lowering and raising device the combination with a main frame of blocks mounted to slide in said main frame, screw rods longitudinally mounted in said main frame and having said blocks threaded thereon, a vehicle body, an interposed toggle frame connecting with said blocks and supporting said vehicle body and elevating or lowering the latter when the screw rods are actuated and in turn actuate said blocks, a supplementary frame on the main frame, a power reverse mechanism mounted on said supplementary frame and having connection with said screw rods, an operating rod mounted to slide on the main frame adjacent to one of said screw rods, pins projecting from said operating rod to be engaged by certain of said blocks and means mounted on said supplementary frame and connecting said operating rod with said power reverse mechanism for the operation of the latter when one of said blocks engages with one of the pins on the said operating rod.

2. In a lowering and raising device the combination with a horizontal frame and horizontal guides on the main frame, screw rods extending longitudinally of said guides, blocks threaded on to said screw rods and operating in said guides, cross shafts connecting said blocks in pairs, a vehicle body, an interposed toggle frame connected to said cross shafts and supporting said vehicle body for the raising or lowering of the latter when the screw rods are actuated to actuate said blocks and in turn operate the toggle frame, an operating rod mounted on said main frame and extending longitudinally to one of said screw rods, pins projecting from said operating rod to be engaged by certain of said blocks and actuate said operating rod, a supplementary frame on the main frame, a horizontally disposed power reverse mechanism on said supplementary frame, means connecting said power reverse mechanism with said screw rods and a combined lever and clutch member for said power reverse mechanism mounted on said supplementary frame and connecting with said operating rod for the operation of said power reverse mechanism when the operating rod is actuated.

3. In a lowering and raising device, the combination with a frame, of guides on the frame, blocks mounted to slide in the guides, screw rods extending longitudinally in the frame and provided with opposed threads, said blocks having threaded engagement with said screw rods, bearing shafts connecting said blocks in pairs, arms carried by one of said bearing shafts to extend upwardly from one of the pairs of blocks, arms carried by the other bearing shaft to extend upwardly from the other pair of blocks, a cross shaft connecting said pairs of arms at their intersection, a body, an extension formed by extended portions of one of the pairs of arms and extending beyond the other pair of arms, a roller carried by said extension to operate against the underside of the said body, a pair of curved arms carried by said cross shaft and having connection with said body and cam-like means carried by one of the pairs of said arms to engage with the curved portions of the curved arms upon movement of the lower portions of said pairs of arms toward each other.

4. In a lowering and raising device the combination with a frame, of guides formed by the frame, screw rods journaled on the frame, and extending longitudinally in said guides, pairs of blocks mounted to slide in the guides and having threaded connection with said screw rods, pairs of arms, bearing shafts connecting the blocks and each pair with one of the pairs of arms connected with one of the bearing shafts and the other pair of arms with the other bearing shaft, a cross shaft connecting the pairs of arms at their intersection, a body, a plate on the underside of the body, an extension formed by extending one of the pairs of arms and a roller carried by the extension to bear against the plate on the underside of the body.

5. In a lowering and raising device the combination with a frame, of guides formed by the frame, screw rods journaled on the frame and extending longitudinally in said guides, pairs of blocks mounted to slide in the guides and having threaded connection with said screw rods, pairs of arms, bearing shafts connecting the blocks and each pair with one of the pairs of arms connected with one of the bearing shafts and the other pair of arms with the other bearing shaft, a cross shaft connecting the pairs of arms at their intersection, a body, a plate on the underside of the body, an extension formed by extending one of the pairs of arms, a roller carried by the extension to bear against the plate on the underside of the body, a pair of curved arms carried by said cross shaft and connecting with the underside of the body and offset cam-like elements carried by one of the pairs of arms to engage with the curved portions of the pair of curved arms upon movement of said pairs of blocks in said guides.

6. In a lowering and raising device the combination with a main frame and a vehicle body of an interposed toggle frame for the raising or lowering of the vehicle body, relative to the main frame, said toggle frame comprising pairs of arms movable toward or away from each other with one pair of arms pivoted to a substantially medial portion of the other pair of arms, and upwardly angularly extending extension formed by continuing the other pair of arms beyond the pivotal connection of the first mentioned pair of arms therewith, the free end of said extension have sliding contact with the said vehicle body, supporting arms connected to the underside of the vehicle body and pivoted at the points of pivotal connection of the first mentioned pair of arms with the substantially medial portion of the second mentioned pair of arms and extension bars carried by the first mentioned pair of arms to move therewith and engage the said supporting arms to support the latter.

In testimony whereof we affix our signatures.

JOSEPH GASSER.
ALFRED H. BARBER.